United States Patent
Johnson

(10) Patent No.: US 12,449,163 B2
(45) Date of Patent: Oct. 21, 2025

(54) BOOSTING WELL PERFORMANCE IN GEOTHERMAL SYSTEMS

(71) Applicant: Schlumberger Technology Corporation, Sugar Land, TX (US)

(72) Inventor: Ashley Bernard Johnson, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 153 days.

(21) Appl. No.: 18/479,187

(22) Filed: Oct. 2, 2023

(65) Prior Publication Data

US 2025/0109891 A1     Apr. 3, 2025

(51) Int. Cl.
    *E21B 7/06*     (2006.01)
    *E21B 43/26*    (2006.01)
    *F24T 10/20*    (2018.01)
    *F24T 50/00*    (2018.01)

(52) U.S. Cl.
    CPC .............. *F24T 10/20* (2018.05); *E21B 7/061* (2013.01); *E21B 43/26* (2013.01); *F24T 50/00* (2018.05); *Y02E 10/10* (2013.01)

(58) Field of Classification Search
    CPC . E21B 7/06; E21B 7/061; Y02E 10/10; F24T 10/20; F24T 50/00
    See application file for complete search history.

(56) References Cited

U.S. PATENT DOCUMENTS

| | | | |
|---|---|---|---|
| 3,642,068 A | 2/1972 | Fitch | |
| 3,878,884 A * | 4/1975 | Raleigh | E21B 43/17 166/308.1 |
| 4,223,729 A * | 9/1980 | Foster | E21B 43/17 166/250.1 |
| 5,785,133 A * | 7/1998 | Murray | E21B 41/0035 175/82 |
| 8,685,187 B2 | 4/2014 | Han | |
| 9,726,157 B2 | 8/2017 | Sweatman | |
| 10,260,778 B2 * | 4/2019 | Sønju | E21B 7/00 |
| 10,551,091 B2 * | 2/2020 | Krüger | E21B 47/06 |

(Continued)

FOREIGN PATENT DOCUMENTS

| | | |
|---|---|---|
| CN | 105840146 A | 8/2016 |
| CN | 108756843 A | 11/2018 |

(Continued)

OTHER PUBLICATIONS

Foreign Reference (Year: 2020).*

(Continued)

*Primary Examiner* — Kenneth L Thompson
(74) *Attorney, Agent, or Firm* — Jeffrey D. Frantz

(57) ABSTRACT

Methods and systems are provided for extracting thermal energy from a geothermal reservoir. One aspect involves drilling at least one sidetrack that extends from a primary wellbore and intersects at least one fracture target in the geothermal reservoir. The at least one sidetrack can be configured to increase fluid flow into the primary wellbore from the at least one fracture target. The increase of fluid flow into the primary wellbore from the at least one fracture target as provided by the at least one sidetrack can increase the amount of captured heat from the geothermal reservoir.

20 Claims, 7 Drawing Sheets

(56) References Cited

U.S. PATENT DOCUMENTS

| | | | |
|---|---|---|---|
| 11,220,882 B2 | 1/2022 | Nevison | |
| 11,434,740 B1 | 9/2022 | Ngyuen | |
| 11,473,410 B1 | 10/2022 | Batarseh | |
| 11,795,365 B1 * | 10/2023 | Nguyen | C09K 8/26 |
| 11,959,666 B2 * | 4/2024 | Fleckenstein | F24T 10/20 |
| 11,976,236 B2 | 5/2024 | Evans | |
| 12,104,828 B2 * | 10/2024 | Geiser | E21B 7/18 |
| 12,258,945 B2 * | 3/2025 | Messner | F03G 4/029 |
| 12,292,212 B2 * | 5/2025 | Barree | E21B 33/03 |
| 2006/0102343 A1 | 5/2006 | Skinner | |
| 2009/0242198 A1 | 10/2009 | Evans | |
| 2010/0032156 A1 | 2/2010 | Petty | |
| 2010/0294494 A1 | 11/2010 | Hefley | |
| 2010/0307756 A1 | 12/2010 | Jung | |
| 2011/0234421 A1 | 9/2011 | Smith | |
| 2013/0292177 A1 | 11/2013 | Meurer | |
| 2014/0262256 A1 | 9/2014 | Zemach | |
| 2015/0204174 A1 | 7/2015 | Kresse | |
| 2015/0233218 A1 | 8/2015 | Myhre | |
| 2015/0275638 A1 | 10/2015 | Wang | |
| 2015/0300327 A1 | 10/2015 | Sweatman | |
| 2017/0321934 A1 | 11/2017 | Kruger | |
| 2018/0016895 A1 | 1/2018 | Weng | |
| 2018/0080309 A1 | 3/2018 | Althoff | |
| 2018/0202266 A1 | 7/2018 | Holland | |
| 2018/0266225 A1 | 9/2018 | Kemick | |
| 2019/0316455 A1 | 10/2019 | Surjaatmadja | |
| 2020/0217181 A1 | 7/2020 | Norbeck | |
| 2020/0277528 A1 | 9/2020 | Taylor | |
| 2021/0363866 A1 | 11/2021 | Al-Nakhli | |
| 2022/0325920 A1 | 10/2022 | Barral | |
| 2023/0045716 A1 * | 2/2023 | Normann | E21B 43/14 |
| 2023/0064121 A1 | 3/2023 | Xia | |
| 2023/0083056 A1 | 3/2023 | Acuna Cespedes | |
| 2023/0288099 A1 | 9/2023 | Toews | |
| 2024/0035710 A1 * | 2/2024 | Toews | E21B 43/305 |
| 2024/0401445 A1 | 12/2024 | Khan | |
| 2024/0401450 A1 | 12/2024 | Johnson | |
| 2024/0401572 A1 | 12/2024 | Khan | |
| 2024/0418412 A1 | 12/2024 | Barree | |

FOREIGN PATENT DOCUMENTS

| | | | | |
|---|---|---|---|---|
| CN | 111043780 A | * | 4/2020 | E21B 43/305 |
| CN | 111520924 A | | 8/2020 | |
| CN | 112012709 A | | 12/2020 | |
| CN | 213898935 U | * | 8/2021 | |
| CN | 113863914 A | | 12/2021 | |
| CN | 120043261 A | * | 5/2025 | |
| JP | 2015121093 A | | 7/2015 | |
| WO | 2021078766 A1 | | 4/2021 | |
| WO | 2022055947 A1 | | 3/2022 | |

OTHER PUBLICATIONS

Foreign Reference (Year: 2025).*
Foreign Reference (Year: 2021).*
Al-Nakhli, A. R., "Chemically-Induced Pressure Pulse: a New Fracturing Technology for Unconventional Reservoirs", SPE-172551-MS, presented at the SPE Middle East Oil Gas Show and Conference, Manama, Bahrain, 2015.

* cited by examiner

BOOSTING WELL PERFORMANCE IN GEOTHERMAL SYSTEMS

FIELD

The present disclosure relates to geothermal systems that extract thermal energy (heat) from a geothermal reservoir.

BACKGROUND

Geothermal systems that extract thermal energy (heat) from a geothermal reservoir are generating considerable interest. A geothermal reservoir is a volume of the subsurface rock that provides a source of thermal energy (heat). FIG. 1 illustrates an example geothermal system that includes an injection well and two production wells that are connected to one another by fractures (fracture network) in a geothermal reservoir. The fractures can be naturally-occurring and/or created or enhanced by stimulation (e.g., hydraulic fracturing). The fractures allow for fluid flow between the injection well and the production wells. Cold water or brine is injected into the injection well and flows through the fractures, where it is heated by contact with the surrounding rock and returns to the surface as steam or hot brine that flows through the production wells. The thermal energy (heat) from the steam or hot brine that flows to the surface can be extracted and used by an energy conversion plant for power generation, large scale heating or cooling, industrial/agricultural processes, or other geothermal applications. After extracting the thermal energy from the steam or hot brine, the resulting cold water or brine can be used for injection into the injection well forming a closed well loop. The system can include one or more pumps (not shown) to circulate the injected water or brine and the produced steam or hot brine in the closed well loop. The pump(s) can be located at the surface or possibly downhole (such as line shaft pumps or electrical submersible pumps). The injection well and/or the production wells of the system can be a multilateral well. For example, the geothermal system of FIG. 1 includes a multilateral production well. Furthermore, the geothermal system can include one or more injection wells and one or more production wells. For example, the geothermal system of FIG. 1 includes one injection well and two production wells.

There can be significant flow loss where a fracture intersects and fluidly couples to the production well(s) of the system. Specifically, the aperture of the fracture at the intersection of the production well can act as a flow restrictor that limits fluid flow through the fracture that connects the injector well(s) and the production well(s). This can limit the amount of heat captured by the system and delivered to the surface and thus decrease the productivity of the system.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Methods are provided for extracting thermal energy from a geothermal reservoir, which involve drilling at least one sidetrack that extends from a primary wellbore and intersects at least one fracture target in the geothermal reservoir. The at least one sidetrack can be configured to increase fluid flow into the primary wellbore from the at least one fracture target. The increase of fluid flow into the primary wellbore from the at least one fracture target as provided by the at least one sidetrack can increase the amount of captured heat from the geothermal reservoir.

In embodiments, the at least one sidetrack can include a plurality of sidetracks that extend from the primary wellbore and intersect the at least one fracture target.

In embodiments, the drilling can be configured to drill the plurality of sidetracks such that the plurality of sidetracks extend from the primary wellbore at a common wellbore depth.

In embodiments, the drilling can be configured to drill the plurality of sidetracks such that the plurality of sidetracks extend from the primary wellbore at varying azimuth angles, which can be controlled, for example, by indexing.

In embodiments, the drilling can be configured to drill the plurality of sidetracks such that the plurality of sidetracks extend from the primary wellbore at different wellbore depths.

In embodiments, the drilling can be configured to drill the plurality of sidetracks without control of the azimuth angles of the plurality of sidetracks.

In embodiments, the drilling can employ a whipstock tool to drill the at least one sidetrack. The whipstock tool can be conveyed by tubing, such as coiled tubing or wireline tubing.

In embodiments, the drilling can employ a directional drilling system to drill the at least one sidetrack.

In embodiments, the method can involve positioning and operating at least one tool in the primary wellbore for drilling a sidetrack that intersects the at least one fracture target, and optionally repeating the positioning and operating the at least one tool in the primary wellbore for drilling another sidetrack that intersects the at least one fracture target.

In embodiments, at least one injection well intersects the at least one fracture target to inject the fluid that flows through the at least one fracture target to the primary wellbore.

In embodiments, the primary wellbore can be part of a production well that is configured to carry a flow of heated fluid through the production well for delivery to the surface.

In embodiments, the primary wellbore can be completed as an open wellbore at least in the interval that intersects the at least one fracture target.

In embodiments, the at least one fracture target includes a naturally-occurring fracture or a fracture created or enhanced by stimulation.

In another aspect, a geothermal system is provided for extracting thermal energy from a geothermal reservoir, which includes a production well with a primary wellbore and at least one sidetrack that extends from the primary wellbore. The primary wellbore and the at least one sidetrack intersects at least one fracture target in the geothermal reservoir. At least one injection well intersects the at least one fracture target. The injection well is configured to inject the fluid that flows through the at least one fracture target to the primary wellbore. The at least one sidetrack is configured to increase fluid flow into the primary wellbore from the at least one fracture target.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIG. 5A is a side view of the whipstock tool. FIG. 5B is a front view of the whipstock tool;

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Embodiments of the present disclosure relate to geothermal systems that include one or more injection wells and one or more production wells that are connected to one another by one or more fractures (e.g., a fracture network) in a geothermal reservoir. The fracture(s) can be naturally-occurring and/or created or enhanced by stimulation (e.g., hydraulic fracturing). Cold water or brine is injected into the injection well and flows through the fracture(s), where it is heated by contact with the surrounding rock and returns to the surface as steam or hot brine that flows through the production well. The thermal energy (heat) from the steam or hot brine that flows to the surface can be extracted and used by an energy conversion plant as illustrated and described above with respect to FIG. 1.

Flow loss can occur where a fracture intersects and fluidly couples to the production well(s) of the system. Specifically, the aperture of the fracture at the intersection of the production well can act as a flow restrictor that limits fluid flow through the fracture. This can limit the amount of heat captured by the system and delivered to the surface and thus decrease the productivity of the system.

According to the present disclosure, one or more sidetracks can be drilled from a primary wellbore of a production well of a geothermal system such that the one or more sidetracks extend from the primary wellbore and the one or more sidetracks as well as the primary wellbore intersect and connect to a fracture. This can increase the fluid flow through the fracture that connects the injection well(s) and production well of the system, which can increase the amount of heat captured by the system and delivered to the surface and thus increase the productivity of the system.

As used herein, a sidetrack is a secondary wellbore that extends away from a primary wellbore. The sidetrack typically has a borehole diameter that is less than or equal to the borehole diameter of the primary wellbore.

Figure 2:
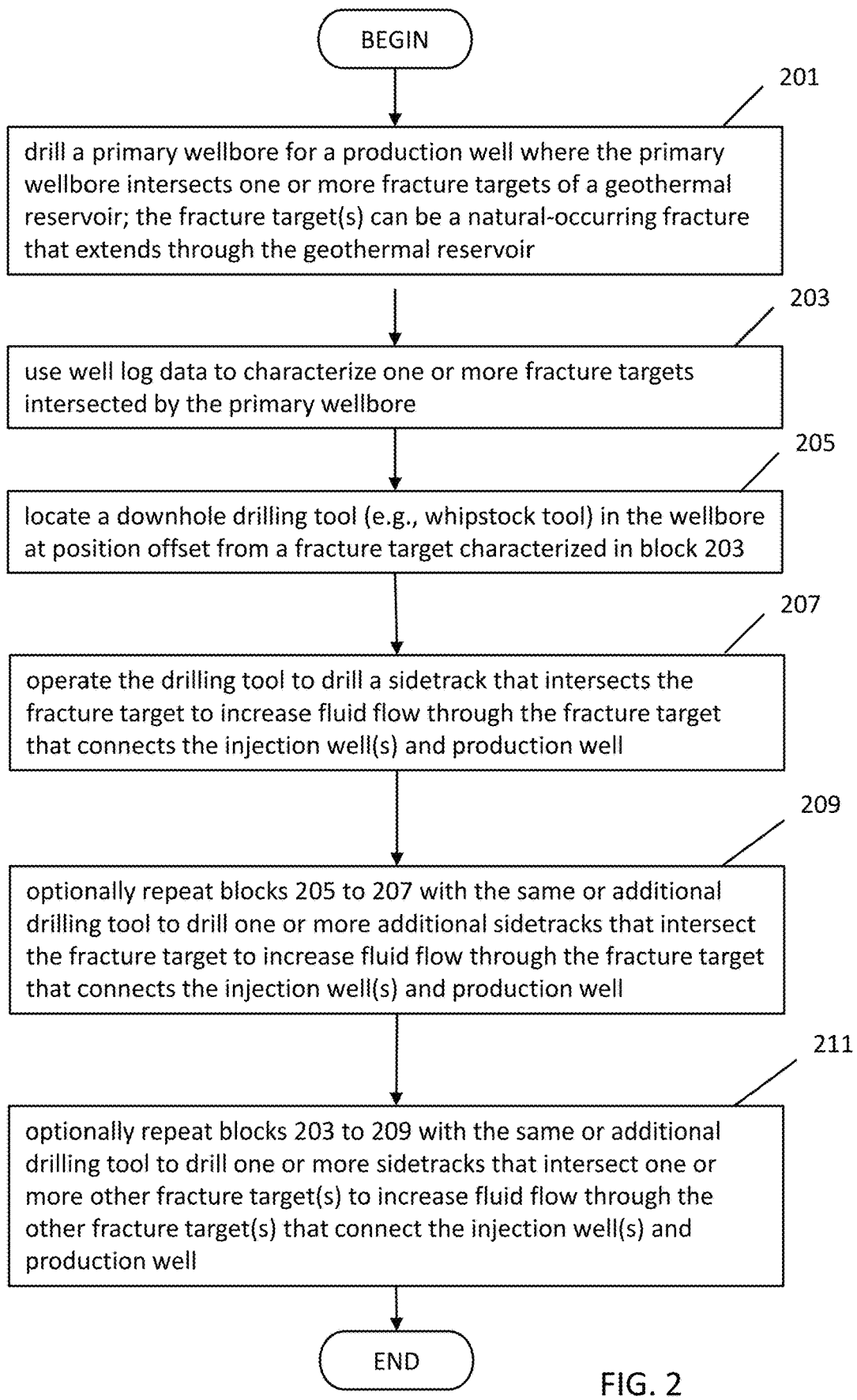
FIG. 2 depicts a flowchart of an example workflow that drills one or more sidetracks that extend from a primary wellbore of a production well of a geothermal system wherein the primary wellbore and the one or more sidetracks intersect and connect to a fracture.

FIG. 2 is a flowchart of an example workflow that drills one or more sidetracks from a primary wellbore of a production well of a geothermal system such that the one or more sidetracks extend from the primary wellbore and the one or more sidetracks as well as the primary wellbore intersect and connect to a fracture.

Figure 1:
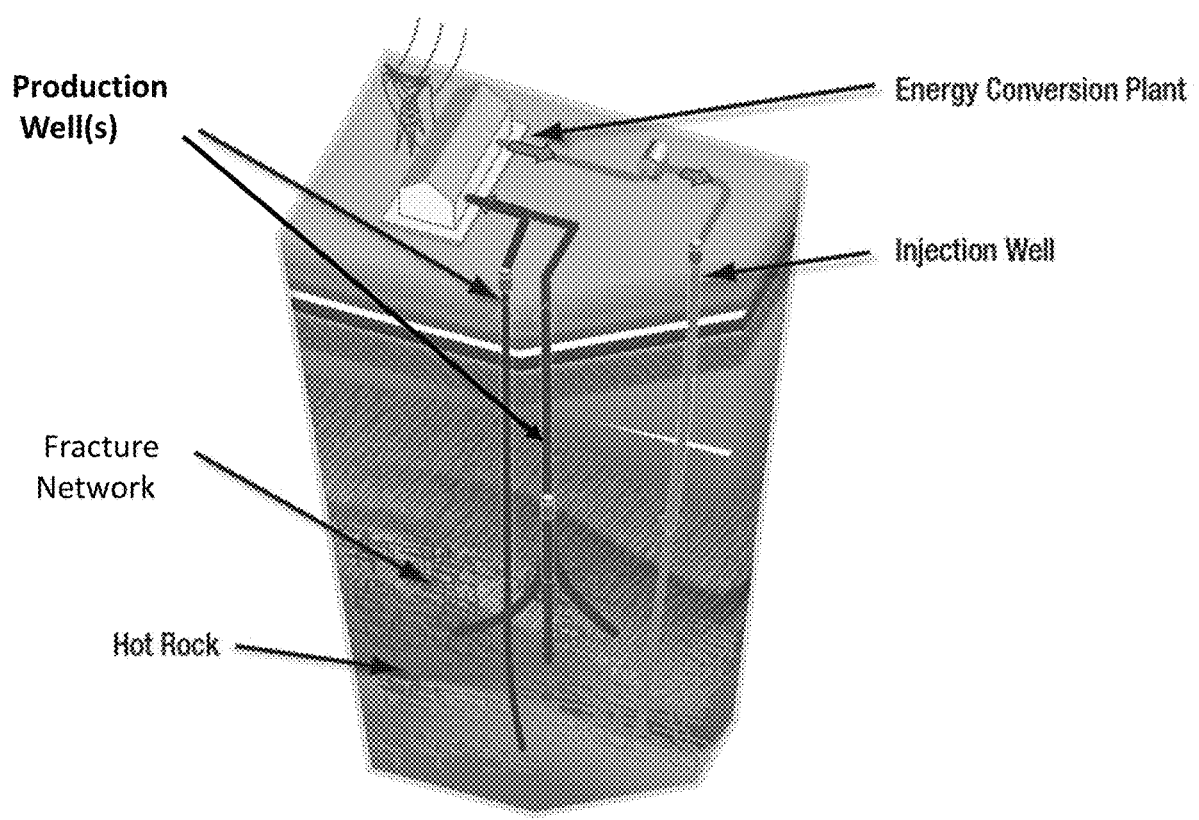
FIG. 1 is a schematic diagram of a geothermal system having an injection well and two production wells connected by fractures (fracture network)
Figure 4:
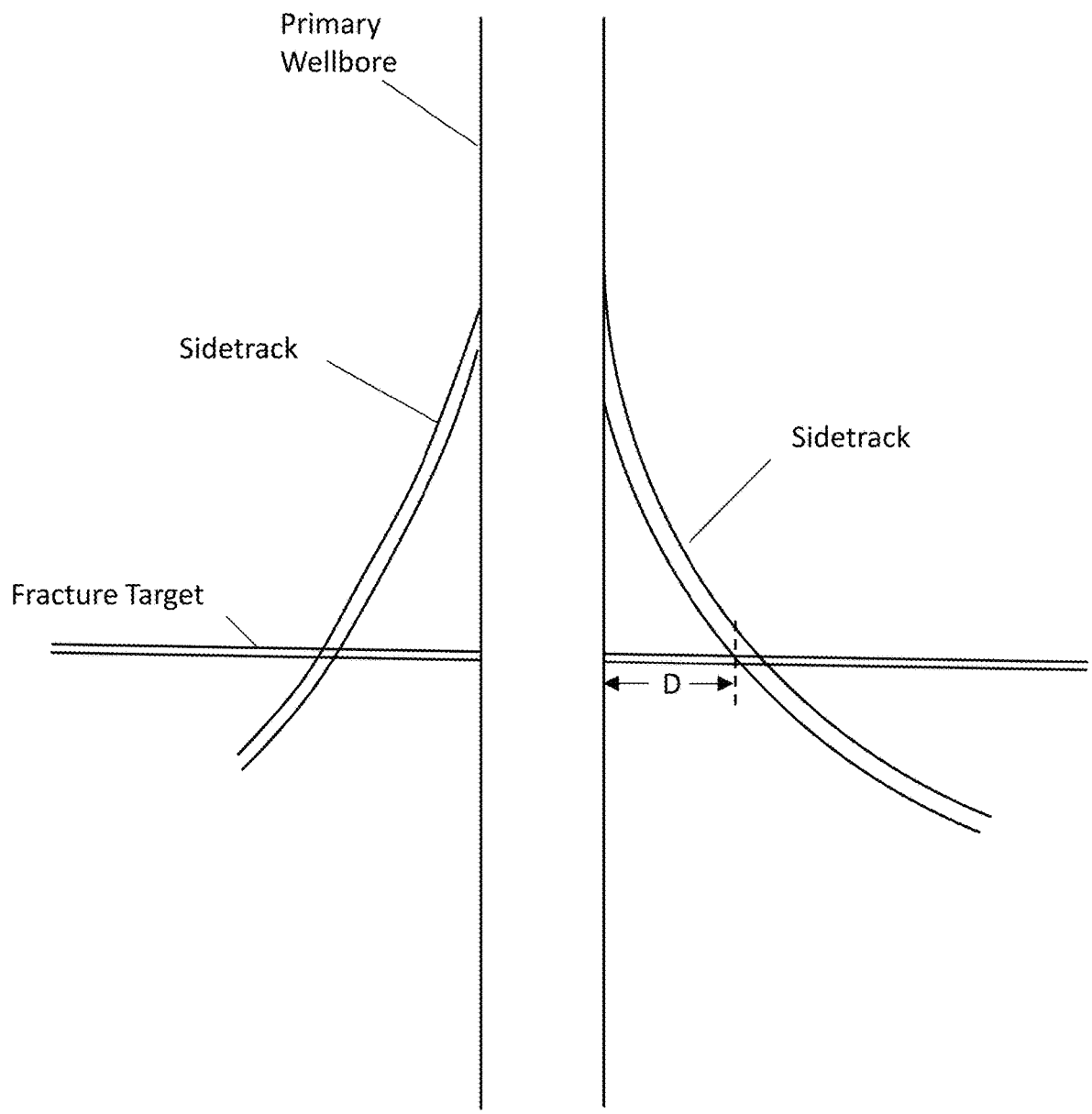
FIG. 4 is a schematic diagram of a production well including a primary wellbore and two sidetracks that extend from the primary wellbore. The primary wellbore and the two sidetrack intersection a fracture target as shown.

In block 201, a primary wellbore is drilled for a production well where the primary wellbore intersects one or more fracture targets of a geothermal reservoir. The fracture target(s) can include a fracture that extends through a geothermal reservoir and connects to the production well. The fracture can be naturally-occurring and/or created or enhanced by stimulation (e.g., hydraulic fracturing. During operation of the geothermal system, the fracture can provide for fluid flow between one or more injection wells and the production well as shown in FIG. 1. Conventional or unconventional drilling methods can be used to drill the primary wellbore. In embodiments, the primary wellbore of the production well can be a vertical wellbore that is drilled to a depth below the fracture target(s) of a geothermal reservoir (FIG. 4). The primary wellbore can be completed as an open wellbore at least in the interval that interests the fracture target(s) of the geothermal reservoir.

Figure 3:
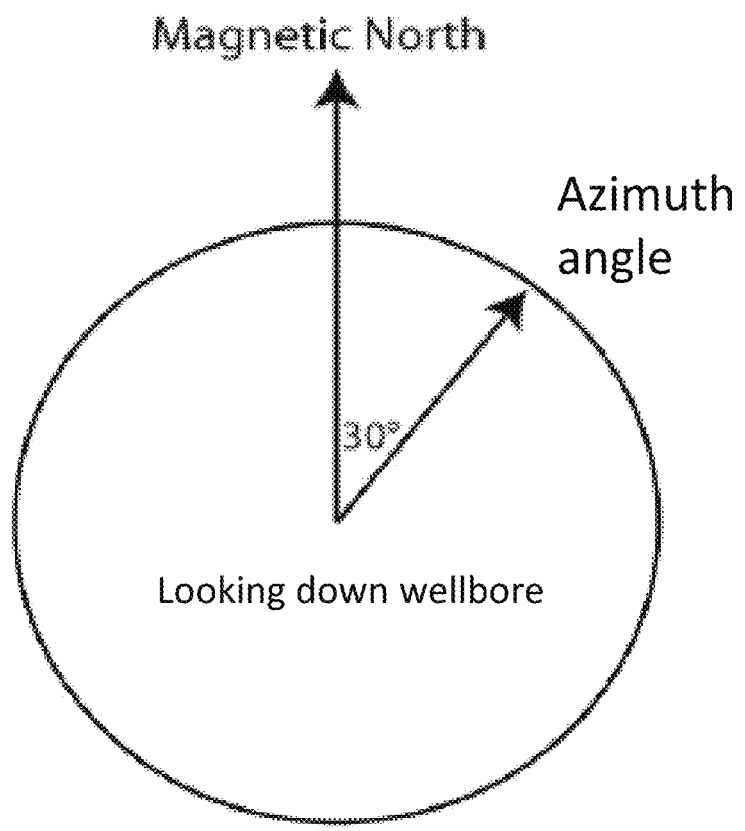
FIG. 3 depicts a reference coordinate system that employs wellbore depth and azimuth angle.

In block 203, well log data can be used to characterize one or more fracture targets intersected by the primary wellbore of block 201. For example, borehole pressure measurements, caliper measurements, resistivity measurements, acoustic or ultrasonic borehole imaging measurements, and/or other downhole measurements can be analyzed to determine estimated wellbore depth and azimuth angle of one or more fracture targets. These measurements can be performed while-drilling or by a wireline tool after drilling. For example, borehole pressure measurements can be analyzed for pressure loss while drilling. When the drilling crosses a fracture target, the borehole pressure will decrease. The depth and optional azimuth angle of such pressure loss can be detected and used as the estimated wellbore depth and optional azimuth angle of a fracture target. FIG. 3 illustrates an example reference coordinate system that employs wellbore depth and azimuth angle. The wellbore depth corresponds to the depth looking down the wellbore. The azimuth angle is measured relative to magnetic north.

In block 205, a downhole tool (e.g., whipstock tool) can be located in the primary wellbore of block 201 at a predefined (controlled) depth position (i.e., kick off point) corresponding to one or more facture targets characterized in block 203 and optionally at a predefined (controlled) azimuth angle. The predefined depth position can be offset relative to wellbore depth of the one or more facture targets characterized in block 203 taking into account a planned length and trajectory of the sidetrack drilling of block 207 to intersect one or more facture targets. The predefined (controlled) azimuth angle can be selected to provide desired separation between multiple sidetracks drilled from the same depth position (i.e., kick off point).

In block 207, the downhole tool can be operated to drill a sidetrack that intersects one or more facture targets characterized in block 203 as shown in FIG. 4. The drilled sidetrack will not have to extend past the fracture target, but could. The sidetrack provides an additional flow path from the fracture target into the primary wellbore, which can increase the fluid flow through the fracture target that connects the injection well(s) and production well during operation of the geothermal system. The sidetrack can reduce the pressure drop between the fracture target and the production well. The increase in fluid flow through the fracture can increase the amount of heat captured by the system and delivered to the surface and thus increase the productivity of the geothermal system.

In embodiments, the sidetrack can be drilled by a whipstock tool having an inclined ramp surface to deflect one or more drill bits or mills toward the wall of the primary wellbore and into the formation. The whipstock tool can be conveyed and set in the primary wellbore by tubing, such as wireline tubing or coiled tubing, as is well known. Coiled tubing is a long, continuous length of pipe wound on a spool. The pipe is straightened prior to pushing into a wellbore and rewound to coil the pipe back onto the spool. Depending on the pipe diameter (1 in. to 4½ in.) and the spool size, coiled tubing can range from 2,000 ft to 15,000 ft or greater length.

Figures 5A, 5B:
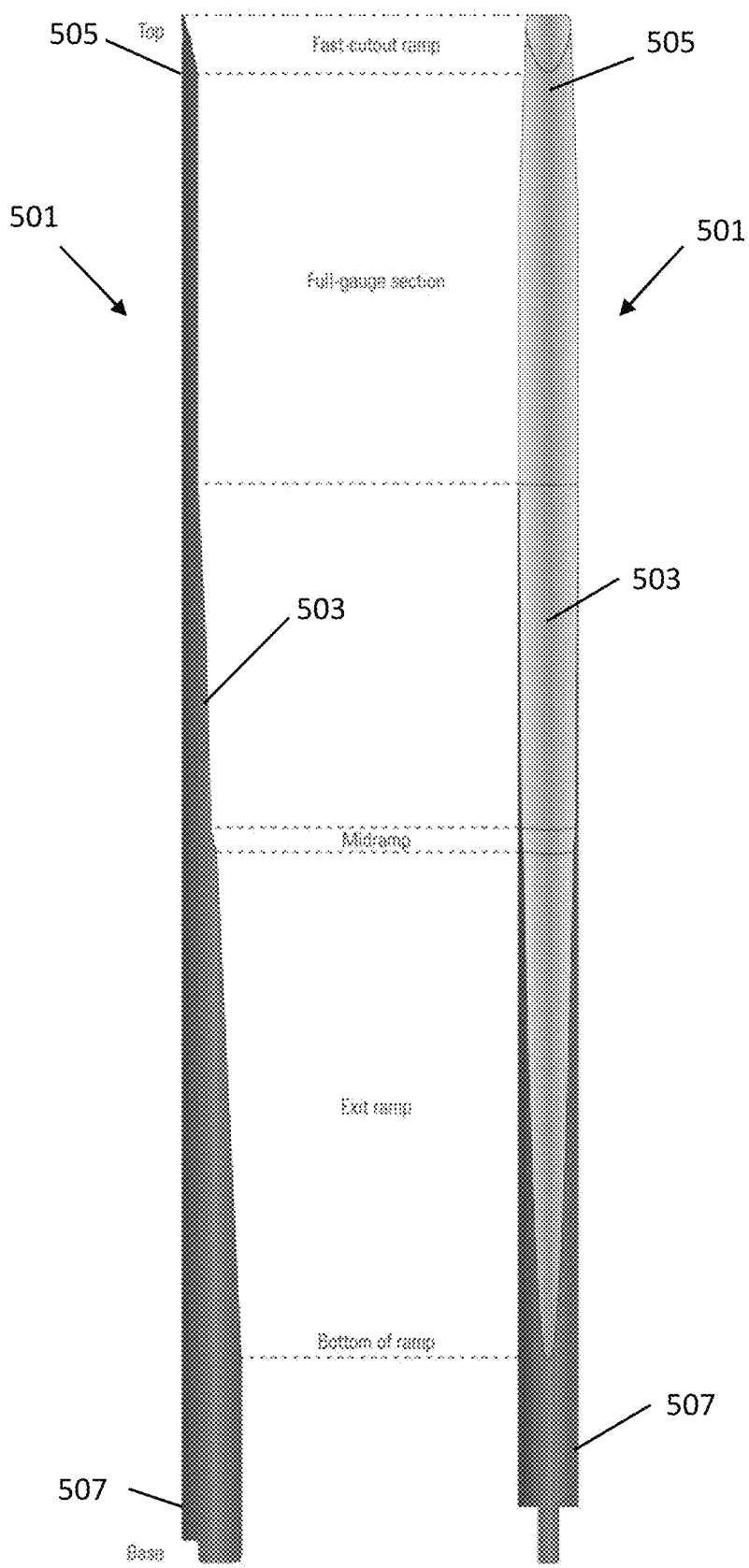
FIGS. 5A and 5B illustrate a whipstock tool that can be used to drill a sidetrack in accordance with the present disclosure.

FIGS. 5A and 5B illustrates a whipstock tool 501 suitable for use in block 207. The whipstock tool includes an inclined ramp surface 503 that extends from the top end 505 to the base end 507 of the tool 501. The tool 501 can be set and held in place in the primary wellbore by an expandable anchor (not shown) that is coupled to the base end 507 of the tool as is conventional. The inclined ramp surface 503 is configured to deflect one or more drill bits or mills toward the wall of the primary wellbore and into the formation as the drill bits or mills are moved over the ramp surface 503 from the top end 503 toward the based end 507. A running tool can be coupled to the top end 505 as is conventional. The running tool can be operated to set the anchor and thus fix the wellbore depth and azimuth angle of the tool 501 in the primary wellbore. A bit/mill assembly having one or more bits or mills can be used to drill the sidetrack as is conventional. The bit/mill assembly can be coupled between the running tool and the whipstock and conveyed with these tools for use in the primary wellbore. After setting the whipstock tool, the bit/mill assembly can be separated from the whipstock tool and operated to drill the sidetrack. Alternatively, the bit/mill assembly can be run into and conveyed in the primary wellbore in a manner separate from the whipstock tool after setting the whipstock tool, and operated to drill the sidetrack. After the drilling operation is completed for the sidetrack, the bit/mill assembly, the whipstock and the anchor can be retrieved and placed/set for drilling another sidetrack or removed from the primary wellbore if desired.

In other embodiments, other suitable directional drilling tools, such as rotary steerable system, can be used to drill the sidetrack in block 207.

In embodiments, the sidetrack can be drilled to penetrate the fracture target at a distance D from the primary wellbore as shown in FIG. 4. In embodiments, the distance D can correspond to approximately five times the diameter of the primary wellbore. Thus, considering an example where the primary wellbore has a diameter of 8.5 inches, the sidetrack can be drilled to penetrate the fracture target at a distance D of approximately (5*8.5) inches or 42.5 inches.

In optional block 209, the operations of blocks 205 to 207 can be repeated with the same or additional drilling tool to drill one or more additional sidetracks that intersect the fracture target to increase fluid flow through the fracture target that connects the injection well(s) and production well. For example, FIG. 4 illustrates two sidetracks that are drilled to penetrate the fracture target.

In optional block 211, the operations of blocks 203 to 209 can be repeated with the same or additional drilling tools to drill one or more sidetracks that intersect one or more other fracture target(s) to increase fluid flow through the other fracture target(s) that connect the injection well(s) and production well.

Figure 6:
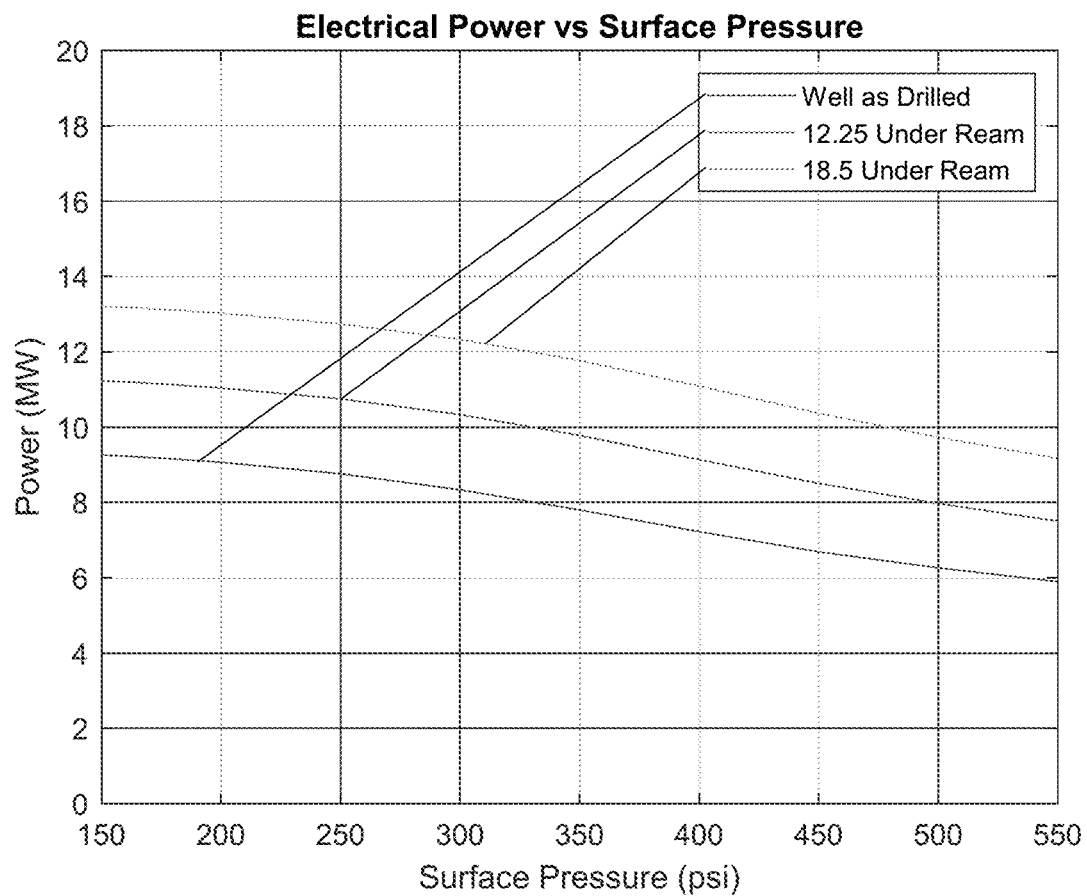
FIG. 6 depicts plots of available power from a geothermal system where a primary wellbore of a production well is left as drilled or subject to conventional underreaming in the production zone. The underreaming is carried out at diameters of 12.25 inches and 18.5 inches, respectively.

FIG. 6 includes plots of available power from a geothermal system where a primary wellbore of a production well is left as drilled or subject to conventional underreaming in the production zone. The underreaming is carried out at diameters of 12.25 inches and 18.5 inches, respectively. Note that an increase in diameter of the underreaming operation from 12.25 inches to 18.5 inches results in an increase in performance. The plots of FIG. 6 are derived from simulations, which assumes an 8.5 inch wellbore, and the same pressure/temperature at the far field. The well is flowed at different rates measuring pressure at the bottom of the well to characterize the losses in the fracture and the wellbore entry. Table 1 below describes the geothermal system used for the simulation.

TABLE 1

| Geothermal system used for simulation | |
|---|---|
| Depth | 8000 ft |
| Wellbore | 8.5 in |
| Formation Temperature | 240° C. |
| Formation pressure, hydrostatic head below wellhead | 1000 ft |
| Power Plant | Conventional |

Figure 7:
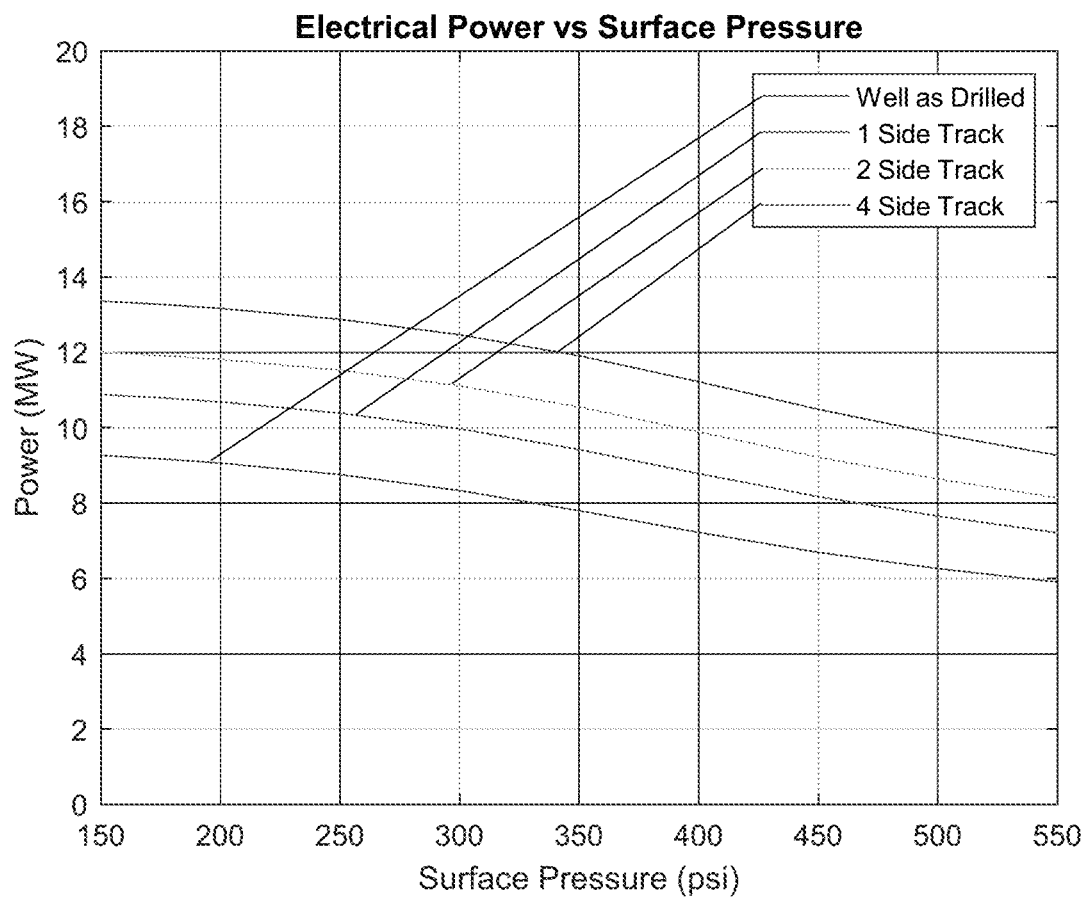
FIG. 7 depicts plots of available power from a geothermal system where a primary wellbore of a production well is left as drilled or subject to sidetrack drilling as described herein. The sidetrack drilling creates one, two or four sidetracks, respectively, in the production zone.

FIG. 7 includes plots of available power from a geothermal system where a primary wellbore of a production well is left as drilled or subject to sidetrack drilling as described herein. The sidetrack drilling creates one, two or four sidetracks, respectively, in the production zone. The plots of FIG. 7 are derived from simulations similar to those described above for FIG. 6. The sidetracks are drilled with a diameter of 3.125 inches. Note that generally one or more sidetracks results in an increase in performance relative to the primary wellbore without sidetracks, and an increase in the number of sidetracks from one to two to four results in a further increase in performance. Furthermore, the use of two or four sidetracks provides performance that is better than or comparable to the performance of the conventional underreaming of FIG. 6. Specifically, it is clear that two sidetracks of length 40-100 ft (a 40 ft sidetrack at 30 deg/100 gives separation >4 ft) can outperform an underreaming operation at 12.5 inches, while four sidetracks can produce the same performance of an underreaming operation at 18.5 inches in the primary wellbore. It is expected that the sidetrack drilling operations could be completed with the removal of many times less rock so a smaller time and energy footprint, thus providing significant cost savings relative to the conventional underreaming.

In embodiments, control of the azimuth angle of the sidetrack(s) while drilling the sidetrack(s) can be omitted. However, if multiple sidetracks are planned and drilled from the same wellbore depth in the primary wellbore, then control of the azimuth angle of the sidetrack(s) while drilling the sidetrack(s) and thus the separation between the sidetracks can be achieved by indexing. In other embodiments, multiple sidetracks can be planned and drilled at different depths to avoid the need to control the azimuth angle of the sidetrack(s) while drilling the sidetrack(s).

In embodiments, the system used to drill the sidetrack(s) as described herein can be implemented with no downhole electronics, thus mitigating many high temperature issues. Although, in the event that the drilling tool (e.g., whipstock tool) is conveyed by coiled tubing, the drilling tool will include a high temperature drilling motor.

There have been described and illustrated herein several embodiments of geothermal systems and related methods used to capture and extract thermal energy (heat) from a geothermal reservoir. While particular configurations have been disclosed in reference to the geothermal systems and related methods, it will be appreciated that other configurations could be used as well. It will therefore be appreciated by those skilled in the art that yet other modifications could be made to the provided invention without deviating from its spirit and scope as claimed.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for extracting thermal energy from a geothermal reservoir, comprising:
   drilling a primary wellbore vertically into and past a fracture target, the primary wellbore having a diameter; and
   drilling a plurality of sidetracks extending from the primary wellbore, wherein the plurality of sidetracks intersect the fracture target in the geothermal reservoir at an intersection point offset from the primary wellbore by approximately five times the diameter and extends past the fracture target, and wherein the plurality of sidetracks extend from the primary wellbore at a plurality of azimuth angles with respect to the primary wellbore and are configured to increase fluid flow into the primary wellbore from the fracture target.

2. The method according to claim 1, wherein increasing the fluid flow into the primary wellbore from the fracture target as provided by the plurality of sidetracks increases an amount of captured heat from the geothermal reservoir.

3. The method according to claim 1, wherein drilling the plurality of sidetracks is configured to drill the plurality of sidetracks such that the plurality of sidetracks extend from the primary wellbore at a common wellbore depth.

4. The method according to claim 1, wherein the plurality of azimuth angles of the plurality of sidetracks are controlled by indexing.

5. The method according to claim 1, wherein drilling the plurality of sidetracks is configured to drill the plurality of sidetracks such that the plurality of sidetracks extend from the primary wellbore at different wellbore depths.

6. The method according to claim 1, wherein drilling the plurality of sidetracks is configured to drill the plurality of sidetracks without control of the plurality of azimuth angles of the plurality of sidetracks.

7. The method according to claim 1, drilling the plurality of sidetracks uses a whipstock tool to drill at least one sidetrack of the plurality of sidetracks.

8. The method according to claim 7, wherein the whipstock tool is conveyed by tubing.

9. The method according to claim 8, wherein the tubing comprises coiled tubing.

10. The method according to claim 8, wherein the tubing comprises wireline tubing.

11. The method according to claim 1, wherein drilling the plurality of sidetracks uses a directional drilling system to drill at least one sidetrack of the plurality of sidetracks.

12. The method according to claim 1, wherein at least one injection well intersects the fracture target to inject a fluid that flows through the fracture target to the primary wellbore.

13. The method according to claim 1, wherein the primary wellbore is part of a production well that is configured to carry a flow of heated fluid through the production well for delivery to a surface location.

14. The method according to claim 1, wherein the primary wellbore is completed as an open wellbore at least in an interval that intersects the fracture target.

15. The method according to claim 1, wherein the fracture target comprises a naturally-occurring fracture.

16. The method according to claim 1, wherein the fracture target comprises a fracture created or enhanced by stimulation.

17. The method of claim 1, further comprising characterizing the fracture target based on downhole measurements.

18. The method of claim 17, wherein the downhole measurements include at least one of borehole pressure measurements, caliper measurements, resistivity measurements, acoustic borehole imaging measurements, ultrasonic borehole imaging measurements, or pressure measurements.

19. The method of claim 18, wherein the borehole pressure measurements are based on pressure loss while drilling.

20. A geothermal system for extracting thermal energy from a geothermal reservoir, the geothermal system comprising:
   a production well with a primary wellbore and at least one sidetrack that extends from the primary wellbore, wherein the primary wellbore and the at least one sidetrack intersect and extend past at least one fracture target in the geothermal reservoir, the at least one sidetrack intersects the at least one fracture target at an intersection point offset from the primary wellbore by approximately five times a diameter of the primary wellbore; and
   at least one injection well that intersects the at least one fracture target, wherein the at least one injection well is configured to inject a fluid that flows through the at least one fracture target to the primary wellbore wherein the at least one sidetrack is configured to increase fluid flow into the primary wellbore from the at least one fracture target for a fluid injected into the at least one fracture target from the at least one injection well.

\* \* \* \* \*